Aug. 16, 1955  H. F. PRASSE  2,715,556
PISTON RINGS
Filed Dec. 27, 1950
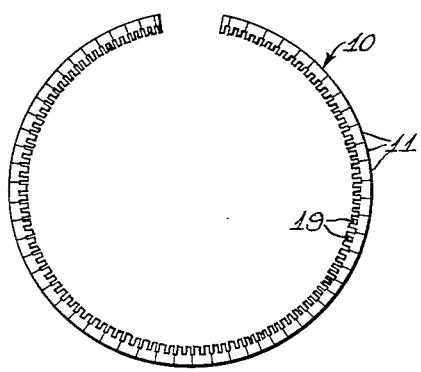
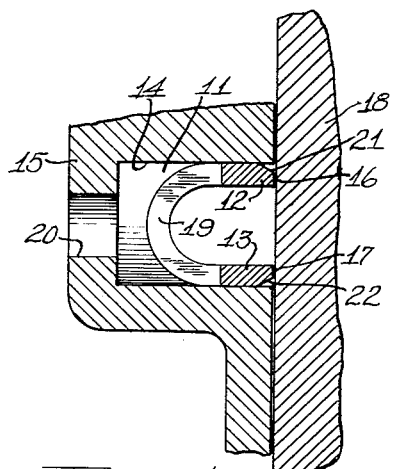
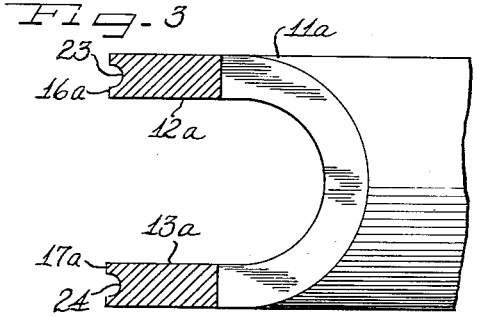
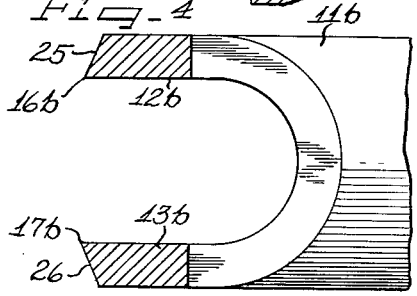
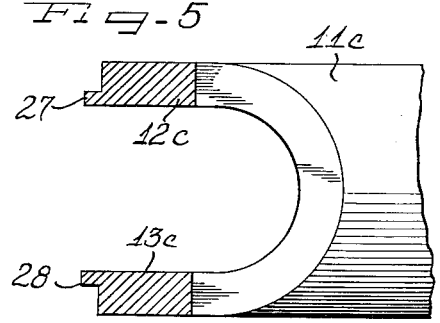
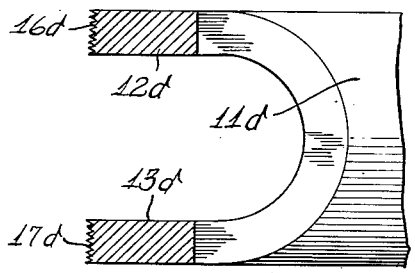
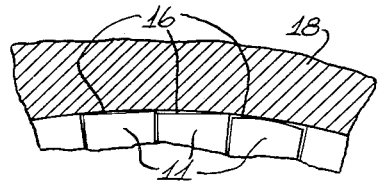
Inventor
Herbert F. Prasse

United States Patent Office 2,715,556
Patented Aug. 16, 1955

2,715,556

PISTON RINGS

Herbert F. Prasse, Gates Mills, Ohio, assignor to Thompson Products, Inc., Cleveland, Ohio, a corporation of Ohio Application December 27, 1950, Serial No. 202,847

3 Claims. (Cl. 309—45)

This invention relates to piston rings and more particularly to piston rings having edges so formed as to quickly wear into conformation with the cylinder wall and to effectively meter oil with minimum friction.

During initial operation in an engine, an important problem is presented in that the piston ring must wear to a certain extent in order to conform to the cylinder bore. Conventional rings cast and machined from iron will ordinarily wear quite rapidly and do not present a problem unless the cylinder bore is out of round to a considerable extent. In order to obtain a more efficient metering of oil, and for various other reasons, a segmented ring construction has been found desirable. In this construction, the ring is fabricated from segments, each segment having a U-shaped cross-section. The segments are preferably of steel, alloy or other material having high resiliency and flexibility so that the edges of the walls of each U-shaped segment will be flexed into engagement with the cylinder wall. Although the segmented ring construction results in a superior conformity with the cylinder wall, the cylinder wall engaging edge of each segment may not conform along its entire length and wear will be necessary to obtain conformity. Further, the materials used in such a ring are usually hard and do not wear quickly.

Another important problem in piston construction is the control or metering of oil. The seal and oil control obtained between a ring and a cylinder wall is a function of the unit pressure therebetween. In the circumferentially expanded, segmental type of ring, for a given design, the unit pressure may be increased by increasing the free diameter of the ring, thereby also increasing the total pressure exerted by the ring against the cylinder wall. Another method of increasing wall pressure might be to increase the material thickness and thereby obtain a greater spring rate which will result in a higher total pressure and give a correspondingly higher unit pressure.

In a ring using an expander behind the ring, another method of obtaining high unit pressure might be to increase the force which the expander exerts upon the ring.

Each of the above methods of increasing unit pressure is objectionable in that the friction between the cylinder wall and ring edge is increased with a corresponding loss of power and reduction of efficiency of the engine.

From the foregoing description, it may be seen that a very desirable piston ring construction exists when a portion of the ring is made of one thickness of material to give the desired durability and spring rate; and the outer bearing portion is made of a different thickness to give the desired unit wall pressure without altering the desired frictional characteristics of the ring.

An object of this invention is to provide a piston ring which is readily constructed, which will efficiently meter oil, which is very durable, and which will quickly wear into conformation with the cylinder wall.

According to this invention, a piston ring is fabricated from segments, each segment having a U-shaped cross-section providing spaced side walls. These side walls have aligned arcuate outer boundaries adapted to slidably and sealingly engage the cylinder walls. The arcuate cross-sectional area of each side wall is much less adjacent the boundary than it is at a distance from the boundary. Since wear is a function of pressure per unit area, it is readily seen that the outer portion of each side wall may quickly wear into conformation with the cylinder wall. It will also be seen that this construction results in a better oil seal and better oil control without increasing friction.

In one embodiment of the piston ring of the present invention, the ring is beveled adjacent the arcuate outer boundary; in another embodiment, the cylinder wall engaging surface of each wall has a groove therein; in another embodiment, the outer surface of each wall is tapered or beveled; in a further embodiment, a thin arcuate flange extends outwardly from each side wall; and in still another form, the cylinder wall engaging surface is made rough as by cutting a plurality of shallow grooves therein. The piston ring of each of these embodiments will quickly wear into conformation, will efficiently meter oil and, as will appear, each embodiment has its own peculiar advantages.

Other objects, features and advantages of the present invention will appear from the following description of the drawings which illustrate several preferred embodiments of the invention and in which:

Figure 1 shows a plan view of a segmental piston ring;

Figure 2 is a cross-sectional view showing a segment of a ring disposed on a piston and contacting a cylinder wall;

Figure 3 is a cross-sectional view of a modified form of segment;

Figure 4 is a cross-sectional view of another modified form of segment;

Figure 5 is a cross-sectional view of a further modified form of segment; and

Figure 6 is a cross-sectional view of still another modified form of segment; and Figure 7 is a plan view illustrating three different ways in which segments might initially engage the cylinder wall.

Referring to Figure 1, reference numeral 10 designates a piston ring fabricated from a plurality of segments 11. The segments 11 may be secured together in any desired fashion such as, for example, in a manner as disclosed by Bowers Patent No. 2,443,065, issued June 8, 1948.

Referring to Figure 2, each segment 11 is substantially U-shaped in cross-section to provide spaced side walls 12 and 13. The ring may be disposed in slot 14 of a piston 15 with aligned outer arcuate boundary surfaces 16 and 17 of the side walls 12 and 13, respectfully, in slidable engagement with cylinder wall 18. Each segment has an inner opening 19 and the piston has holes 20 to provide for flow of oil.

Figure 7 is an example of how three of the segments might initially engage the cylinder wall. The edge 16 of the left-hand segment illustrated engages the cylinder wall only at the ends thereof, the central portion thereof being spaced from the cylinder wall; the center segment illustrated is canted so that the edge 16 engages the wall only at one end; and the edge 16 of the right-hand segment illustrated has a curvature such that only the central portion thereof engages the cylinder wall. It is thus seen that it is highly desirable that the edges 16 be so formed as to quickly wear into conformation with the cylinder wall.

Referring again to Figure 2, the side walls 12 and 13 are beveled adjacent the boundary surfaces 16 and 17 as designated by reference numerals 21 and 22 thus decreasing the area of surfaces 16 and 17, increasing the initial rate of wear thereof and decreasing friction. The side walls are comparatively thick except at the outer portion so that they are sufficiently stiff, durable and unlikely to crack or break. The beveling can be readily achieved by machining, grinding or any desired operation. The slope and extent of the beveling depends upon the rate of wear desired, the oil seal desired and the permissible friction and may be varied to accommodate various different edges and surfaces.

Figure 3 shows, in cross-section, a modified segment 11a having spaced side walls 12a and 13a. Grooves 23 and 24 are cut in the arcuate boundary surfaces 16a and 17a of the side walls 12a and 13a to reduce the cylinder wall engaging area, to reduce friction and to increase the initial rate of wear. These grooves 23 and 24 may be of any desired shape and depth to obtain a desired rate of wear and may be readily cut by any desired operation. It may be noted that chipping or breaking of the surface 16a or 17a at one side of the groove will not effect the operation of the surface on the other side of the groove.

Figure 4 shows a modified segment 11b having spaced side walls 12b and 13b which are tapered back from the arcuate outer boundary 16b and 17b as designated by reference numerals 25 and 26. Since the area of the side walls 12b and 13b initially engaging the cylinder wall will be very small, the friction will be low, the initial rate of wear will be very high and the segment will quickly conform to the cylinder wall.

Figure 5 shows, in cross-section, another modified segment 11c in which thin arcuate flanges 27 and 28 extend outwardly from side walls 12c and 13c. This flange presents a small area in initial engagement with the cylinder side wall will efficiently meter oil with minimum friction and will quickly wear into conformation.

Figure 6 shows, in cross-section, a further modified segment 11c in which the outer cylinder wall engaging surfaces 16d and 17d of the side walls 12b and 13b, respectively, are roughened as by cutting a plurality of shallow grooves therein. The area of the surface initially engaging the cylinder wall will thereby be very small, the friction will be very small and the initial rate of wear therefore quite high. This rough surface may be readily produced by a number of finishing operations.

It is noted that it is desirable to obtain effective high unit pressures throughout the life of the ring and the edges are preferably of such extent that they will not wear off after long periods of operation.

It will be understood that modifications and variations may be effected without departing from the novel concepts of the present invention.

I claim as my invention:

1. A piston ring comprising a plurality of segments, each of said segments having a substantially U-shaped cross-section providing spaced-apart side walls, one of said side walls having an arcuate outer surface and the other side wall having an outer arcuate surface aligned therewith, said aligned arcuate surfaces being adapted to slidably engage a cylinder wall, and the arcuate surface of each side wall having a groove therein extending longitudinally thereof.

2. A piston ring comprising a portion of substantially U-shaped cross-section providing spaced-apart side walls, said side walls having outer aligned arcuate surfaces adapted to slidably and sealingly engage a cylinder wall, and each of said surfaces having a groove therein extending longitudinally thereof to provide an outer quick-wearing portion.

3. A piston ring comprising a plurality of segments each being generally U-shaped and defining spaced apart side walls having aligned arcuate boundaries for engagement with a cylinder wall, each of said side walls having a plurality of shallow grooves at said boundary with the arcuate cross-sectional area of each side wall at said boundary being substantially less than the arcuate cross-sectional area at a point spaced a predetermined distance from said boundary, the portions of each side wall spaced greater than said predetermined distance from said boundary having uniform cross-sectional area, and the hardness of the material constituting the segments being so related to said predetermined distance as to wear down to said point in a fraction of the useful life of the ring.

References Cited in the file of this patent

UNITED STATES PATENTS

| 1,802,566 | Marien | Apr. 28, 1931 |
| 2,031,341 | Stumpf | Feb. 18, 1936 |
| 2,131,970 | Ritz | Oct. 4, 1938 |
| 2,243,064 | Ballard | May 27, 1941 |
| 2,267,367 | Bowers | Dec. 23, 1941 |
| 2,280,744 | Bowers | Apr. 21, 1942 |
| 2,346,204 | Bowers | Apr. 11, 1944 |
| 2,346,896 | Bowers | Apr. 18, 1944 |
| 2,621,989 | Norton | Dec. 12, 1952 |

FOREIGN PATENTS

| 441,634 | Great Britain | Apr. 23, 1935 |
| 107,740 | Australia | June 16, 1939 |